United States Patent [19]
Bowyer

[11] 3,960,069
[45] June 1, 1976

[54] METHOD AND APPARATUS FOR CONTROLLING A PRESS

[75] Inventor: Ralph Mitchell Bowyer, Cincinnati, Ohio

[73] Assignee: Formica Corporation, Cincinnati, Ohio

[22] Filed: Mar. 21, 1974

[21] Appl. No.: 453,449

[52] U.S. Cl. .................. 100/38; 100/93 P; 156/359
[51] Int. Cl.² ........................................ B30B 15/34
[58] Field of Search ............ 100/93 P, 38; 156/359, 156/583

[56] References Cited
UNITED STATES PATENTS

| | | | |
|---|---|---|---|
| 2,432,215 | 12/1947 | Stocker | 100/93 P |
| 3,348,474 | 10/1967 | Virta et al. | 100/93 P |

Primary Examiner—Richard E. Aegerter
Assistant Examiner—L. Footland
Attorney, Agent, or Firm—Frank M. Van Riet

[57] ABSTRACT

A method of controlling a laminating press in accordance with a predetermined time-temperature command profile and apparatus for use therein, are disclosed.

6 Claims, 3 Drawing Figures

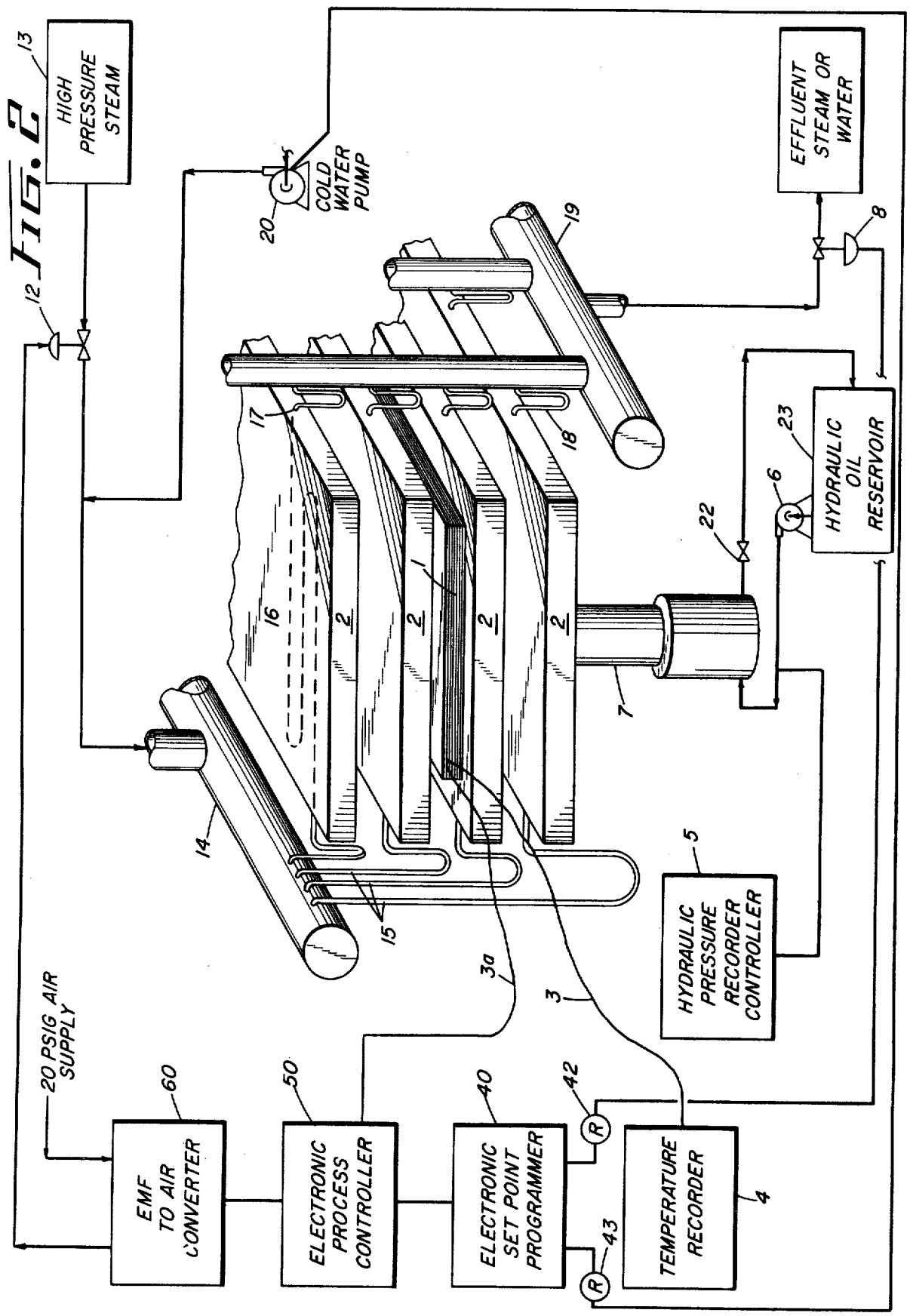

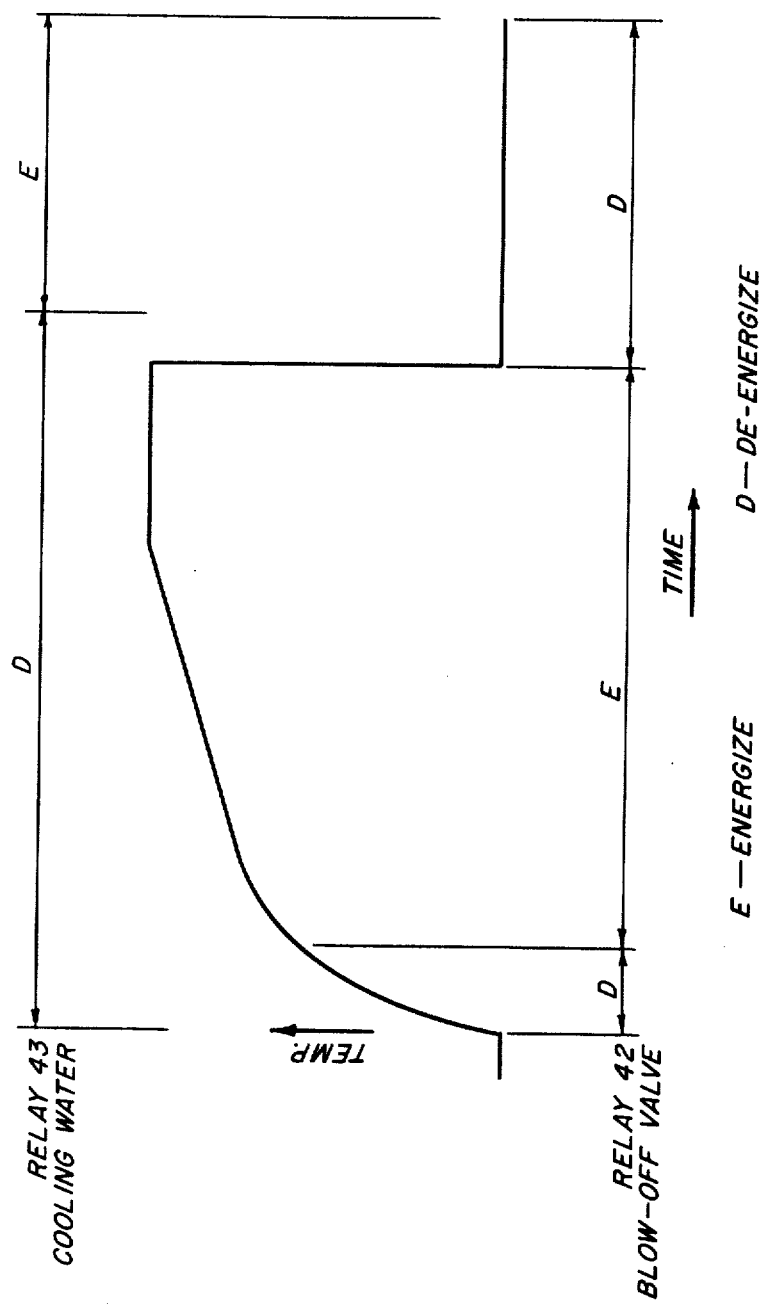

3,960,069

METHOD AND APPARATUS FOR CONTROLLING A PRESS

BACKGROUND OF THE INVENTION

For many years decorative, high pressure laminates have been used as a surfacing material in residential and commercial structures wherein aesthetic effects are desired in combination with functional behavior, such as wear, heat and stain resistance. Typical applications of said laminates are surfacing for walls, partitions, table tops, counter tops, furniture, doors and the like. These decorative laminates have been produced by a plurality of prior art processes. In making such laminates, it is conventional to utilize a plurality of core sheets generally composed of kraft paper which have been impregnated with a thermosetting phenolic resin.

It is generally desired to make laminates that range from about 1/32 inch to about ⅛ inch in thickness but, if desired, they may be made in even greater thicknesses. Accordingly, the thicker laminates require the use of a total number of core sheets comprising about three, five, seven, nine or even more. For decorative laminates, there is then placed on the stack of core sheets, with its decorative surface out of contact with the core sheets, a decorative overlay sheet which generally comprises a sheet of alpha-cellulose paper bearing a printed design or a light color thereon impregnated with a noble thermosetting resin. Resins for the decorative sheets are aminotriazine resins and additionally the unsaturated polyester resins, the epoxy resins and the like.

It is generally desirable, when making decorative laminates, to make use of a protective overlay sheet which is similar to the decorative sheet but generally devoid of design. It is placed atop the decorative sheet and in the final laminate is transparent.

Assemblies of this type may be individually laminated by application of heat and pressure thereto in a batch type process. However, for obvious economic reasons it is common practice to consolidate a plurality of these individual laminating assemblies into one large assembly, or press pack, and then to laminate this pack by heat and pressure application.

In building such a pack, an individual assembly is placed with its decorative overlayment surface adjacent to a highly polished stainless steel press plate. The function of the press plate is twofold. First, it provides a smooth, defect-free surface to one side of the laminate. Second, it serves to separate pairs of back-to-back assemblies, thus permitting a plurality of these assemblies to be consolidated into laminates in one operation, usually in back-to-back relationship.

In its simplest embodiment, a back-to-back press pack consists of this arrangement of one pair of individual laminating assemblies with a separator sheet between their core members. In actual commercial practice, however, the entire procedure is usually repeated many times, until a pack having a desired height has been built.

The press pack is then pressed or molded. This is accomplished by placing the pack between the platens of a hydraulic press heated with steam, hot water or other suitable heating medium under pressure. The press usually has multiple openings so that several packs may be pressed at once. A modern laminating press may have as many as twenty-two openings for sheet sizes up to 5 ft. × 12 ft. Since each opening can generally accommodate at least a ten-sheet pack, many laminates may be produced in each press cycle. When the pack has been placed between the press platen, pressure is applied until a net pressure in excess of 1,000 psi exists over the projected area of the sheets being laminated. With the pack under suitable pressure, the press temperature is raised by means of the fluid heating media which is introduced into the channels within the individual press platens. On a typical cycle, the temperature will rise to about 140°C. within 30 minutes, remain at this level for 10 minutes to 30 minutes to accomplish curing of the resins, and return to room temperature in another 30 minutes. Cooling is accomplished by passing a cooling fluid through the same channels which guide the heating media or by simply cooling the heating media via a heat exchanger.

The word "curing" is a term frequently misused in the plastics industry. In molding and similar operations outside of the field of high-pressure laminates, curing refers to the transition of a resin from a soluble or fusible condition to an unsoluble-infusible condition by heat, chemical action or air drying. Thus when a liquid epoxy resin, for example, is poured into a mold and allowed to harden, it is said to be cured. In the manufacture of high-pressure laminates, curing takes place under heat and pressure in the platen press, as described hereinabove. However, after the fusion of the resin is accomplished, and the resin has become thermoset, there is an additional type of curing required which is more analogous to the annealing of glass. The laminate cannot be immediately removed from the press and allowed to cool rapidly in air because embrittlement of the surface layers will occur usually accompanied by warpage or buckling. As with newly cast or molded glass, the laminates must be slowly cooled by a gradual reduction of the heat and pressure to ambient and atmospheric conditions by gradually lowering the temperature of the platens.

After the curing is complete, the packs are removed from the press, the packs are disassembled and the laminates are sent on for finishing, while the press plates are returned for the next press run.

The use of controlled apparatus in processes for the production of laminates has in the past been limited to manual manipulation of the blow-off valve, application and regulation of the heat and the subsequent cooling of the press. This manual control of the laminating press has caused an increase in the cost of the resultant laminate because of the high cost of labor and has further increased the incidence of decreased quality and the need for more uniformity in products, due to the factor of human error which such a system, of necessity, inputs into the process.

SUMMARY

I have now discovered a new and novel improvement which overcomes the difficulties exhibited by the prior art control procedures and apparatus in the pressing of laminate assemblies. My invention permits the accurate control of the time-temperature relationship experienced by materials being cured by the heating and subsequent cooling at elevated temperatures. Particularly, press cycles run by my invention are more consistant and uniform than the prior art manual control cycles which have three times more cycle to cycle variation than the automatic press cycles. Thus laminate quality and uniformity iis assured at the lowest possible unit cost.

I attain these advantageous results by the application and cooperation of feedback control techniques and process control equipment, configured as a process control scheme, to the curing process achieved by heating and cooling under pressure. My invention automates and significantly improves cure cycle control.

My method is a novel scheme for press control optimization of the curing in a laminating press comprising a set point programmer, a process controller with proportional, integral and derivative modes of control, and associated automated valves employed in a novel cooperation with the heating and cooling of a press. The novel process disclosed herein is controlled by reference to the temperature of the laminate assembly in the press and not by reference to the temperature or pressure of the heating means i.e. steam, as was previously practiced. Utilizing the prior procedures of control, a critical time gap existed between the recordation of the steam pressure and the temperature of the laminate assembly and the decision which the operator had to make. If the temperature was to be changed, the operator had to first determine that a change was necessary and then determine how much of a change to make. As a result of this time gap, the laminate temperature could be too low or too high, as the case may be, and as a result the ultimate laminate curing cycle was either too long or too short. Additionally, the curing of each laminate batch was different from that batch previously prepared or that prepared subsequent to it. Uniformity in laminates and their corresponding properties was, therefore, sufficiently inconsistent enough so as to cause material problems for the ultimate consumer with regard to the conditions he must employ in order to fabricate the laminate into the product he desired.

The process and apparatus of the instant invention gives almost instantaneous temperature measurement, determination of a need for a temperature change and carrying out of the determined change.

BRIEF DESCRIPTION OF THE DRAWINGS

FIG. 2 is a diagrammatic view of the laminating press assembly temperature measuring and controlling process and apparatus of the instant invention, all parts thereof identical with those of FIG. 1 being designated by the same numerals.

FIG. 3 represents a typical program which is drawn out on a card. The card contains the programmed time-temperature cycle input to the set point programmer 40 of FIG. 2 and the corresponding programmed function of the relays 42 and 43 thereof to be executed during a press cycle.

DESCRIPTION OF THE INVENTION INCLUDING PREFERRED EMBODIMENTS

Figure 1:
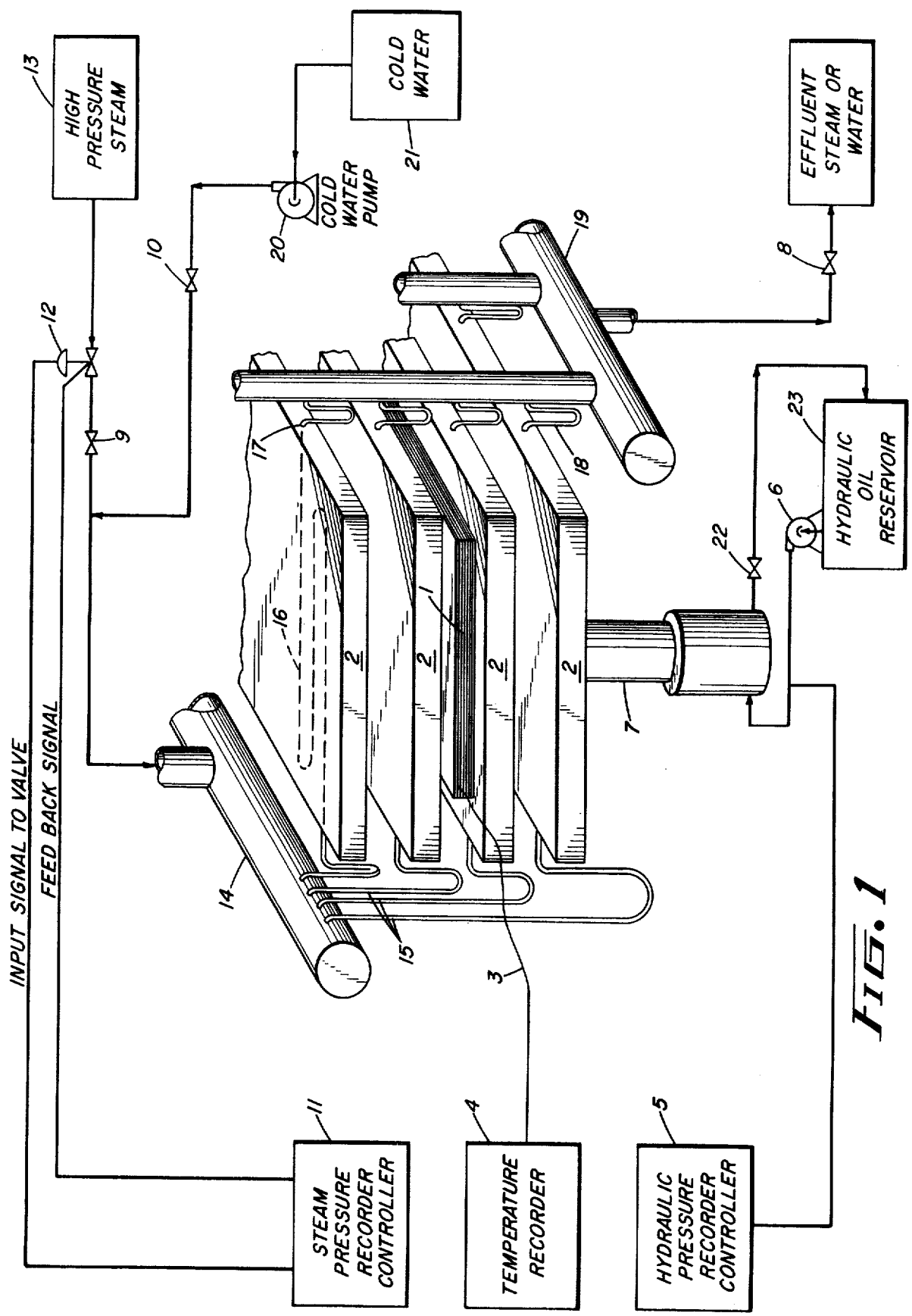
FIG. 1 is a diagrammatic view of a laminating press steam temperature measuring and controlling operation as previously practiced in the prior art.

With reference to the drawings, specifically FIG. 1, a diagrammatical view of a steam heated, water cooled laminating press and controls of the prior art is shown. The superstructure of the press has been omitted for purposes of clarity. In operation, the press pack 1 is inserted between the platens 2 of the press. Only one press pack is shown, however, in commercial operation, press packs would be placed between each pair of press platens. A thermocouple sensing wire 3 is inserted into the pack and connected to a temperature recorder 4.

The press cycle begins with the hydraulic pressure recorder controller 5 manually set to 1400 psi. Valve 22 is closed and pump 6 is activated to thereby pump oil from reservoir 23 to ram 7 to force the ram upward and close the press.

At the same time, effluent or by-pass valve 8 is manually opened, manual steam supply valve 9 is opened and water supply valve 10 is closed. Steam pressure regulator controller 11 is manually set between about 20–100 lbs. gage pressure activating pneumatic control valve 12 and permitting steam 13 to flow through manifold 14 which distributes the steam through the flexible piping 15 to channels 16 in the press platens 2. The steam exits the platens at 17, passes through flexible piping 18 to second manifold 19 and is discharged through valve 8.

This preliminary preheatup completely removes all water from the platens from the previous pressing within a few minutes. By-pass valve 8 is then manually closed.

The temperature of the pack, as indicated by recorder 4, will gradually rise to between about 130°–150°C. within about 15–30 minutes. Depending on the laminate grade specification, a specific time-temperature profile must be followed. The operator manually adjusts the steam pressure in the press, in order to execute the desired profile to the best of his ability. Press cycle operation is dependent upon operator skill. The specified cure cycle usually consists of a heat-up period and a cure period of about 10–30 minutes. At the end of the cure period, the press is cooled by first manually shutting off the steam regulator controller 11, closing steam supply valve 9, and opening valves 10 and 8. After the pressure in the press drops to atmospheric, a period of from about 2–10 minutes, the cooling water pump 20 is started thereby forcing cold water 21 to flow through the manifold 14, piping 15, channels 16, piping 18, manifold 19 and discharge through effluent valve arrangement 8.

It usually takes about 10–30 minutes to reduce the temperature of the pack to about 30°C.–40°C. after which the water pump is shut off and the water supply valve 10 is closed. Then the hydraulic pump 6 is shut off and valve 22 is opened relieving the hydraulic pressure and opening the press.

The press is now ready for the unloading operation which entails removal of the packs from the press.

FIG. 2 is a diagrammatic view of the instant invention as applied to a steam-heated, water-cooled press. The equipment used in the control scheme comprises, in combination, an electronic set point programmer 40, an electronic process controller with proportional, integral and derivative modes of control 50 and an EMF to pneumatic converter 60.

The programmer 40 can be any commercially available electrostatic line-following programmer, having a minimum of two programmable function switches, e.g. relays.

The desired program is drawn on a 5 × 8 inch plastic card, with one axis for time, the other for the programmed parameter, in this case temperature. The plastic card is coated with a conductive surface and by scribing the desired time-temperature profile on the card, two electrically isolated conductive planes are created. By energizing each plane with opposite phase AC voltages, a voltage gradient is established across the gap on the chart. A non-contacting probe seeks the zero potential existing at the center of the program curve, mechanically positioning an output potentiometer contained therein. When the program card is inserted into a slot on the front of the porgrammer and the program start switch is energized, the program advances and the non-contacting probe follows the curve, precisely positioning the potentiometer whose output is proportioned to the curve drawn on the chart. This output is used to command the controller 50. The program time base is established by a synchronous motor and direct-drive friction roller.

Thus, the set point programmer 40 is used to program the heating time-temperature profile that is to be imposed on the material being cured in the press. The programmed time-temperature profile is used as the set point input to the process controller 50. Furthermore, the set point programmer 40 controls the open or close function of blow-off valve 8 and the on or off function of the cooling water pump 20 as functions of time by means of two programmable relays 42 and 43. The programmable relays are phototransistor sensors that conduct when the conductive coating of the plastic card is scraped away, as described above, allowing light from a light-emitting diode therein to energize the photo sensors, thus energizing the relays. A typical programming scheme is illustrated in FIG. 3, more fully discussed below.

The process controller 50 can be any commercially available unit having proportional, integral, and derivative modes of control and the capability of accepting a remote set point signal from the output potentiometer of programmer 40. The proportional, integral and derivative modes of control generate a control signal based on the error between the set point temperature and the actual temperature in the laminate pack 1 equivalent to that shown in the following functional relationship:

$$M = K_c[E + 1/T_i \int E \, dt + T_D dE/dt]$$

where M is the controller output signal, $E$ is the error between the set point temperature and the temperature in the laminate pack, $K_c$ is the controller gain, $T_i$ is the controller reset time, $T_D$ is the controller derivative time. Integration and differentiation of the error signal for the integral and derivative modes of control is with respect to time $t$.

In order to insure that the controller can be optimally tuned for the system dynamics experienced in a laminate press, the controller gain is adjustable such that a variation in proportional band of from 1 to 50% of span is attainable. In addition, the reset time $T_i$ of the integral mode of control is adjustable in the range 0.02–20 repeats/minute and the rate time $T_D$ of the derivative mode of control is adjustable in the range 0–5 minutes.

In practice, the process controller 50 accepts the set point input from the programmer 40 and a thermocouple temperature feedback signal from thermocouple sensor 3a, located in the pack 1 being cured. It compares the error between these two signals and generates a corrective control signal provided by the proportional, integral and derivative modes of control. If desired, a second thermocouple sensor 3 may be connected to a recorder 4 for a retained record.

The signal from 50 is input to pneumatic converter or transducer 60 which converts a direct current milliampere input signal to a pneumatic control signal. The direct current input energizes a coil positioned in a permanent magnetic field thus exerting axial thrust, proportional to the direct current input signal. The axial thrust is utilized in a pneumatic/mechanical force balance which yields a pneumatic output signal, also proportional to the direct current input signal. The pneumatic control signal in turn actuates steam valve 12 to permit steam 13 to flow, as discussed above in reference to FIG. 1, through manifold 14, channels 16 in platens 2, etc. consequently controlling the temperature of pack 1 in such a manner to obtain the programmed time temperature cycle at thermocouple sensor 3a.

The combined effect is automatic operation of the steam valve 12, the blow-off valve 8 and the cooling water pump 20 in such a way as to achieve a programmed cure cycle, including an initial blow-off, heat-up and cure period and then final blow-off and cooling.

FIG. 3 illustrates a typical programmed time-temperature cycle input to the set point programmer 40 and the corresponding programmed function of relays 41 and 42 of FIG. 2 to be executed during a press cycle.

As can be seen, as the profile is followed by the electrostatic line follower in programmer 40, a signal indicating the required temperature in the laminate assembly is continually fed to process controller 50. Relays 42 and 43 are both de-energized at the beginning of the program. Controller 50, however, is calling for heat because the temperature of press pack 1 is determined by sensing wire 3a to be too low to conform to the program line. Relay 42, however, is then energized first which causes valve 8 to be closed and allows control of the steam pressure in platen channels 16. When the desired temperature has been reached and maintained for the required time, relay 42 is de-energized and after a suitable blow-off period, which relieves the steam pressure in the press, relay 43 is energized causing cold water pump 20 to actuate and cool the press by pumping cold water therethrough.

With this invention, the execution of the press cycle is simplified significantly. The hydraulic pressure controller 5 is manually set to 1400 psi. Valve 22 is closed and pump 6 is activated to thereby pump oil from reservoir 23 to ram 7 to force the ram upward and close the press. The proper cycle card, dependent on the laminate grade being pressed, is selected and inserted into programmer 40 and the time base sweep is initiated. Heating and cooling of the press is controlled automatically, as described hereinabove. When the cooling water pump stops, signifying the end of the press cycle, hydraulic pump 6 is shut off and valve 22 is opened relieving the hydraulic pressure and opening the press. The press is now ready for the unloading operation. Check valves (not shown) are generally positioned just prior to the junction of the steam and cooling water supply pipes in the usual manner in each line to insure the separation of the heating and cooling fluids.

Although the operation of this invention is herein detailed for a steam-heated, water-cooled laminating press, the method and apparatus are directly applicable to a water-heated, water-cooled or an oil-heated, oil-cooled laminating press. In either case, the control signal from the process controller 50 positions the control valve regulating make-up hot water, hot oil, cold water or cold oil to the recirculating heating/cooling system of the press. In addition, the method is illustrated herein utilizing electronic programmer and process control instrumentation. Where it is desirable, pneumatic instrumentation is readily interchangeable with the electronic components.

I claim:

1. A method of controlling the pressing of a laminate assembly wherein the assembly is placed between heatable platens of a press which is then closed subjecting the assembly to pressure comprising
   1. continually providing an output signal to a controller from a programmer in response to a desired time and temperature command profile,
   2. continually measuring, solely at said assembly, the temperature of said laminate assembly being cured between the platens of the press,
   3. continually providing said measured temperature to said controller,
   4. continually determining the conformity of said measured temperature to the programmed temperature of said profile in conjunction with said time of said profile,
   5. continually determining a need for a temperature change in said curing laminate assembly from said conformity determination,
   6. continually providing first and second signals, each to one of a pair of relays and a third signal to a heat source from said programmer in accordance with said command profile which third signal energizes first means for introducing heating media to the platens and which first and second signals energize second means for removing heating media from said platens and third means for introducing cooling media to said platens, respectively, and
   7. continually controlling the temperature of said curing laminate assembly in accordance with said need.

2. A method according to claim 1 wherein said curing laminate assembly temperature is controlled by providing said first signal to a pneumatic control means for providing BTU input to said platens.

3. A method according to claim 1 wherein said output signal is provided to said controller by an electrostatic line follower.

4. Apparatus for controlling a laminate assembly press comprising heatable platens which, when closed, subject said assembly to temperature and pressure, comprising
   1. programmer means for receiving and responding to a time and temperature command profile,
   2. controller means capable of determining the conformity of a measured temperature to a desired temperature in relation to time and the need for a change of the assembly temperature,
   3. means for providing an output signal from said programmer means in response to said command profile to said controller means,
   4. means for measuring the temperature of said laminate assembly and transmitting the resultant measured temperature to said controller means,
   5. first relay means for energizing means for removing heating media from said press in response to said programmer,
   6. a second relay means for energizing means for introducing cooling media to said platens in response to said programmer means and
   7. means for controlling the temperature of said assembly in accordance with the need therefor determined by said controller.

5. Apparatus according to claim 4 including line following means in said programmer means to respond to said profile.

6. Apparatus according to claim 4 including pneumatic control means for providing BTU input to said platens responsive to said controller means.

* * * * *